(12) United States Patent
Sano et al.

(10) Patent No.: US 11,505,243 B2
(45) Date of Patent: Nov. 22, 2022

(54) STEERING CONTROL DEVICE AND ELECTRIC POWER STEERING DEVICE

(71) Applicant: Showa Corporation, Gyoda (JP)

(72) Inventors: Kosuke Sano, Haga-gun (JP); Junya Hirata, Haga-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 235 days.

(21) Appl. No.: 16/710,956

(22) Filed: Dec. 11, 2019

(65) Prior Publication Data
US 2020/0114965 A1    Apr. 16, 2020

Related U.S. Application Data

(63) Continuation-in-part of application No. PCT/JP2017/027649, filed on Jul. 31, 2017.

(30) Foreign Application Priority Data

Jul. 20, 2017   (JP) .............................. JP2017-140567

(51) Int. Cl.
  *B62D 6/10*   (2006.01)
  *B62D 5/04*   (2006.01)
  *B62D 15/02*  (2006.01)
  *H02P 6/16*   (2016.01)

(52) U.S. Cl.
  CPC ............. *B62D 6/10* (2013.01); *B62D 5/0424* (2013.01); *B62D 5/0463* (2013.01); *B62D 15/021* (2013.01); *H02P 6/16* (2013.01)

(58) Field of Classification Search
  CPC ...... B62D 6/10; B62D 5/0424; B62D 5/0463; B62D 15/021
  See application file for complete search history.

(56) References Cited

U.S. PATENT DOCUMENTS

| | | | | |
|---|---|---|---|---|
| 8,825,301 B2 * | 9/2014 | Sugawara | ............ | B62D 5/0463 701/42 |
| 9,446,789 B2 * | 9/2016 | Tsubaki | ............... | B62D 15/025 |
| 9,840,272 B2 * | 12/2017 | Sugawara | ............... | B62D 6/10 |

(Continued)

FOREIGN PATENT DOCUMENTS

| JP | 2004-338562 A | 12/2004 |
|---|---|---|
| JP | 2005-170257 A | 6/2005 |

(Continued)

OTHER PUBLICATIONS

International Search Report dated Sep. 12, 2017 for the corresponding International Patent Application No. PCT/JP2017/027649.

*Primary Examiner* — Tony H Winner
*Assistant Examiner* — Michael R Stabley
(74) *Attorney, Agent, or Firm* — Leason Ellis LLP

(57) ABSTRACT

A steering control device includes: an electric motor configured to apply an assist force to steering of a steering wheel; a torque sensor configured to detect steering torque of the steering wheel; a base target current setting unit configured to set a base driving force of the electric motor on the basis of the steering torque detected by the torque sensor; and an addition determination unit configured to determine whether a driving force larger than the base driving force is to be set, on the basis of a rotation speed of the electric motor.

10 Claims, 12 Drawing Sheets

(56) References Cited

U.S. PATENT DOCUMENTS

| | | | |
|---|---|---|---|
| 9,896,121 B2 * | 2/2018 | Fukuda | ............... B62D 5/046 |
| 2011/0276229 A1 | 11/2011 | Sugawara et al. | |
| 2015/0144418 A1 | 5/2015 | Ohno et al. | |
| 2017/0015348 A1 | 1/2017 | Sasaki et al. | |

FOREIGN PATENT DOCUMENTS

| | | | |
|---|---|---|---|
| JP | 2005170257 | * | 6/2005 |
| JP | 2009-143372 A | | 7/2009 |
| JP | 2015-127194 A | | 7/2015 |
| WO | WO-2010/087295 A1 | | 8/2010 |
| WO | WO-2015/141254 A1 | | 9/2015 |

* cited by examiner

STEERING CONTROL DEVICE AND ELECTRIC POWER STEERING DEVICE

CROSS-REFERENCE TO RELATED APPLICATIONS

This application is a continuation-in-part of PCT application No. PCT/JP2017/027649 filed on Jul. 31, 2017, which claims the benefit of priority to Japanese Patent Application No. 2017-140567 filed on Jul. 20, 2017, the contents of both of which are incorporated herein by reference.

FIELD OF THE INVENTION

The present invention relates to a steering control device and an electric power steering device.

BACKGROUND OF THE INVENTION

It has been known that an electric power steering device has a friction element. For example, the electric power steering device disclosed in Japanese Patent Application Laid-Open Publication No. 2004-338562 includes a decelerator composed of a gear attached to a rotary shaft of an electric motor and another gear mating with the gear and fixed to a handle shaft. The electric power steering device disclosed in Japanese Patent Application Laid-Open Publication No. 2004-338562 performs motor control such that a target current is generated from a vehicle speed and steering torque to produce an assist force.

Technical Problem

A steering control device such as an electric power steering device includes a friction element. For this reason, there is a fear that a driving force of the electric motor caused by the target current generated on the basis of the steering torque is unable to overcome the frictional force and thus a rack does not move (wheels do not roll). As a result, there may be a time lag between, for example, the start of turning of the steering wheel (steering member) and the start of assist force application from the electric motor.

An object of the present invention is to provide an electric power steering apparatus that can shorten the time until the electric motor starts to apply an assist force in response to the start of operation of the steering member.

SUMMARY OF THE INVENTION

Solution to Problem

With the above object in view, an aspect of the present invention relates to a steering control device including: an electric motor configured to apply an assist force to steering of a steering member; a torque detection unit configured to detect steering torque of the steering member; a base driving force setting unit configured to set a base driving force of the electric motor on the basis of the steering torque detected by the torque detection unit; and a determination unit configured to determine whether a driving force larger than the base driving force is to be set, on the basis of a rotation speed of the electric motor.

Advantageous Effects of Invention

According to the present invention, it is possible to shorten the time until the electric motor starts to apply an assist force in response to the start of operation of the steering member.

DETAILED DESCRIPTION OF THE INVENTION

Embodiments of the present invention will be described in detail below with reference to the attached drawings.

First Embodiment

Figure 1:
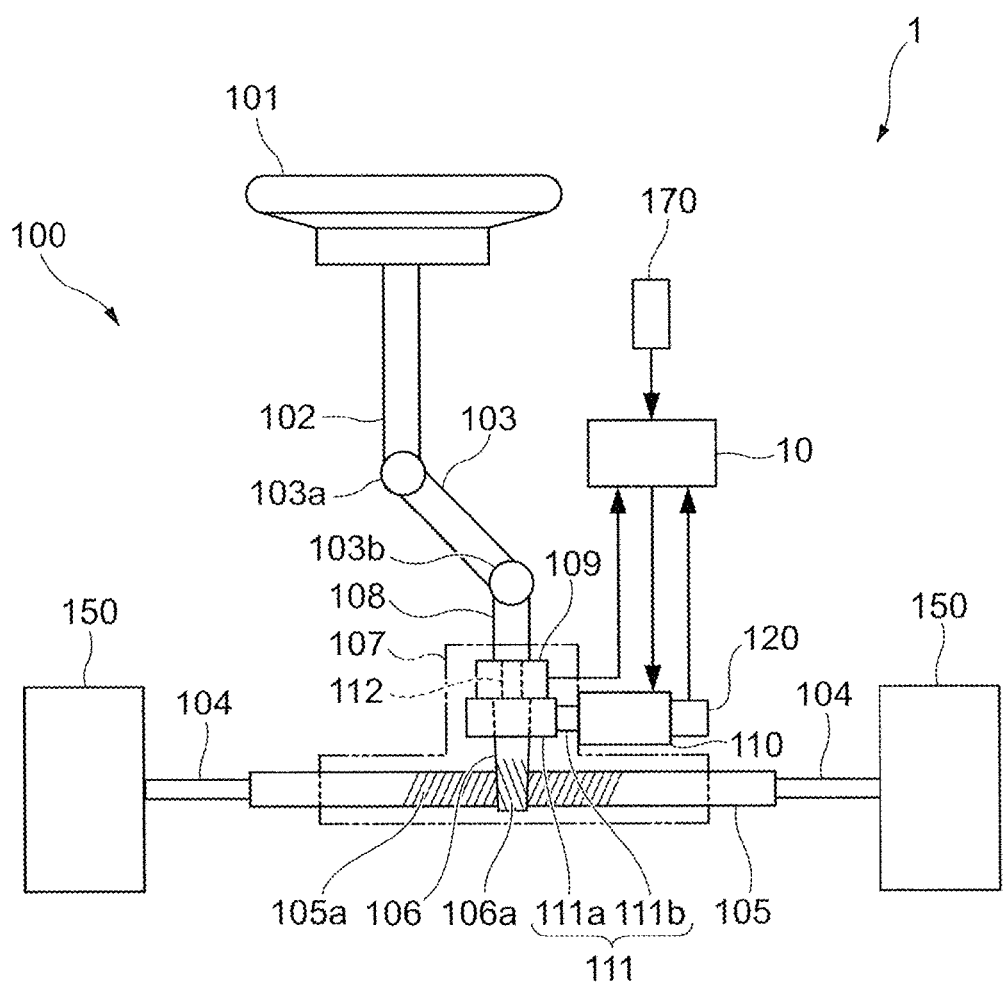
FIG. 1 is a schematic configuration diagram of an electric power steering device according to embodiments.

FIG. 1 depicts a schematic configuration of an electric power steering device 100 according to the embodiments.

The electric power steering device 100 (hereinafter may be simply referred to as the "steering device 100") is a steering device to change a traveling direction of a vehicle to any direction. By way of example, the steering device 100 of the present embodiment is used in an automobile 1, which is an example of the vehicle. FIG. 1 illustrates the automobile 1 when viewed from the front.

The steering device 100 includes a wheel-like steering wheel (handle) 101, which is an example of the steering member, operated by a driver to change a traveling direction of the automobile 1, and a steering shaft 102 integral with the steering wheel 101. The steering device 100 further includes an upper coupling shaft 103 coupled with the steering shaft 102 via a universal joint 103a, and a lower coupling shaft 108 coupled with the upper coupling shaft 103 via a universal joint 103b. The lower coupling shaft 108 rotates along with rotation of the steering wheel 101.

The steering device 100 further includes a tie rod 104 coupled with left and right wheels 150 as rolling wheels, and a rack shaft 105 coupled with the tie rod 104. The steering device 100 further includes a pinion 106a that constitutes a rack and pinion mechanism together with a rack teeth 105a formed on the rack shaft 105. The pinion 106a is formed at a lower end of the pinion shaft 106. The pinion shaft 106 applies by rotation a driving force (rack shaft force) to the rack shaft 105 by which the left and right wheels 150 are rolled.

The steering device 100 further includes a steering gearbox 107 containing the pinion shaft 106. Inside the steering gearbox 107, the pinion shaft 106 is coupled with the lower coupling shaft 108 via a torsion bar 112. The steering gearbox 107 contains a torque sensor 109, which is an example of the torque detection unit, configured to detect steering torque T applied to the steering wheel 101 on the basis of relative rotation angles of the lower coupling shaft 108 and the pinion shaft 106, namely the torsion amount of the torsion bar 112.

The steering device 100 further includes an electric motor 110 supported by the steering gearbox 107, and a deceleration mechanism 111 that decelerates rotation of the electric motor 110 before transmitting it to the pinion shaft 106. The deceleration mechanism 111 includes a worm wheel 111a fixed to the pinion shaft 106, and a worm 111b coupled with an output shaft of the electric motor 110 via a shaft coupling (not shown). The electric motor 110 applies a rotary force to the pinion shaft 106, thereby applying a driving force (rack shaft force) to the rack shaft 105, which in turn causes the wheels 150 to roll. The electric motor 110 of the present embodiment is a three-phase brushless motor including a resolver 120 that outputs a rotational angle signal θms depending on a motor rotational angle θm, which is a rotation angle of the electric motor 110.

The steering device 100 further includes a controller 10 to control operation of the electric motor 110. The controller 10 receives output signals from the aforementioned torque sensor 109. Via a network (CAN) for communication of signals to control various apparatuses installed on the automobile 1, the controller 10 also receives other signals including an output signal v from a vehicle speed sensor 170 that detects a vehicle speed Vc, which is a travelling speed of the automobile 1.

The steering device 100 configured as above drives the electric motor 110 on the basis of the steering torque T detected by the torque sensor 109 and transmits the driving force (generated torque) of the electric motor 110 to the pinion shaft 106. The driving force (generated torque) of the electric motor 110 thus assists the driver in steering the steering wheel 101. That is, the electric motor 110 applies an assist force to the driver's steering of the steering wheel 101.

(Controller)

An explanation will be given of the controller 10.

Figure 2:
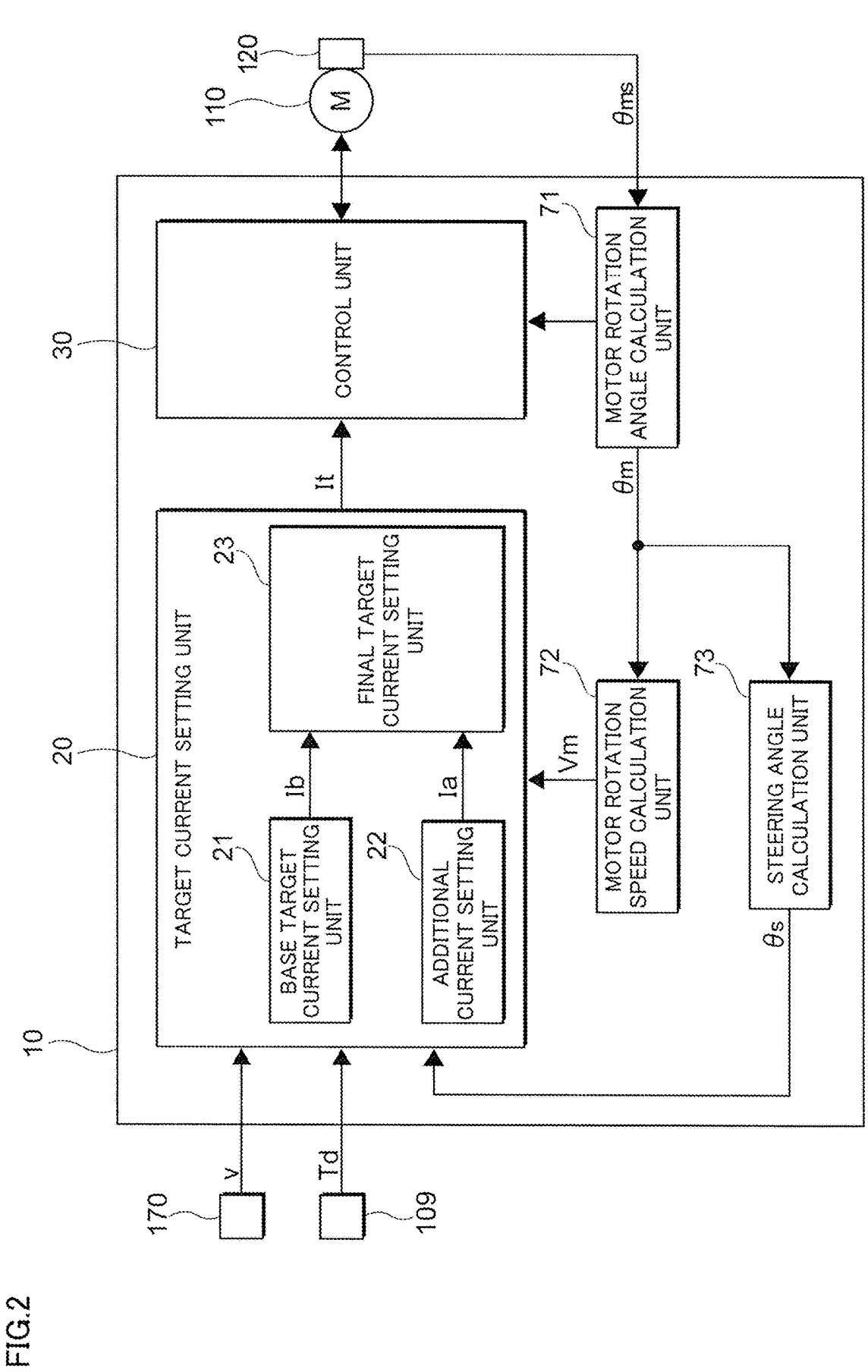
FIG. 2 is a schematic configuration diagram of a controller.

FIG. 2 depicts a schematic configuration of the controller 10.

The controller 10 is an arithmetic logical unit consisting of a CPU, a ROM, a RAM, a backup RAM etc.

The controller 10 receives input of various signals including a torque signal Td, which is an output signal converted from the steering torque T detected by the above torque sensor 109, a vehicle speed signal v corresponding to the vehicle speed Vc from the vehicle speed sensor 170, and a rotation angle signal θms from the resolver 120.

The controller 10 includes a target current setting unit 20 and a control unit 30. On the basis of signals such as the torque signal Td and the vehicle speed signal v, the target current setting unit 20 calculates (sets) a target current It to be supplied to the electric motor 110. The control unit 30 performs various controls including a feedback control based on the target current It calculated by the target current setting unit 20. The controller 10 further includes a motor rotation angle calculation unit 71 and a motor rotation speed calculation unit 72. The motor rotation angle calculation unit 71 calculates a motor rotation angle θm of the electric motor 110. The motor rotation speed calculation unit 72 calculates a motor rotation speed Vm on the basis of the motor rotation angle θm calculated by the motor rotation angle calculation unit 71. The controller 10 further includes a steering angle calculation unit 73 that calculates a steering angle θs, which is a rotation angle of the steering wheel 101.

[Target Current Setting Unit]

The target current setting unit 20 includes a base target current setting unit 21 and an additional current setting unit 22. The base target current setting unit 21 calculates a base target current Ib on which the setting of the target current It is based. The additional current setting unit 22 sets an additional current Ia to be added to the base target current Ib upon predetermined conditions being met, which will be described later. The target current setting unit 20 further includes a final target current setting unit 23 that determines the target current It finally supplied to the electric motor 110.

The base target current setting unit 21 sets the base target current Ib on the basis of the torque signal Td and the vehicle speed signal v. By way of example, when the steering torque T is positive, the base target current setting unit 21 sets a positive base target current Ib, and when the steering torque T is negative, the base target current setting unit 21 sets a negative base target current Ib. Also by way of example, at a given absolute value of the steering torque T, the base target current setting unit 21 sets a larger absolute value of the base target current Ib with decrease in the vehicle speed Vc. The base target current setting unit 21 may set a dead zone range where the base target current Ib is set to zero regardless of the value of the steering torque T. The base target current setting unit 21 sets the base target current Ib; in other words, the base target current setting unit 21 sets a base driving force on the basis of the steering torque T.

The additional current setting unit 22 will be described later.

The final target current setting unit 23 sets the target current It that is the sum of the base target current Ib set by the base target current setting unit 21 and the additional current Ia set by the additional current setting unit 22 (It=Ib+Ia).

[Controller]

The control unit 30 includes: a motor drive control unit (not shown) to control operation of the electric motor 110; a motor driving unit (not shown) to drive the electric motor 110; and a motor current detection unit (not shown) to detect an actual current Im actually flowing to the electric motor 110.

The motor drive control unit includes a feedback (F/B) controller (not shown) that performs feedback control on the basis of deviation between the target current It finally determined by the target current setting unit 20 and the actual current Im supplied to the electric motor 110 detected by the motor current detection unit. The motor drive control unit further includes a PWM signal generator (not shown) that generates a pulse width modulation (PWM) signal to PWM-drive the electric motor 110.

The motor driving unit is a so-called inverter, and includes for example six independent transistors (FETs) as switching elements. Out of the six transistors, three transistors are connected between a positive electrode line of a power source and an electric coil of each phase, and the other three transistors are connected between a negative electrode (earth) line and the electric coil of each phase. Gates of two transistors selected from the six transistors are driven to enable switching operation of the two transistors, whereby driving of the electric motor 110 is controlled.

The motor current detection unit detects a value of the actual current Im flowing to the electric motor 110, on the basis of voltages at both ends of a shunt resistor connected to the motor driving unit.

[Motor Rotation Angle Calculation Unit, Motor Rotation Speed Calculation Unit, Steering Angle Calculation Unit]

The motor rotation angle calculation unit 71 calculates the motor rotation angle θm on the basis of the rotation angle signal θms from the resolver 120.

The motor rotation speed calculation unit 72 calculates the motor rotation speed Vm of the electric motor 110 on the basis of the motor rotation angle θm calculated by the motor rotation angle calculation unit 71.

The steering angle calculation unit 73 calculates the steering angle θs on the basis of the motor rotation angle θm calculated by the motor rotation angle calculation unit 71. The calculation is based on the fact that there is correlation between the rotation angle (steering angle θs) of the steering wheel 101 and the motor rotation angle θm of the electric motor 110 due to mechanical connection between the steering wheel 101, the deceleration mechanism 111 and the like. For example, the steering angle calculation unit 73 calculates the steering angle θs on the basis of the integrated value of differences between a current value and a previous value of the motor rotation angle θm, which is periodically (e.g., every 1 millisecond) calculated by the motor rotation angle calculation unit 71.

Here, a direction in which the relative rotation angle between the steering wheel 101 (the lower coupling shaft 108) and the pinion shaft 106 changes (a direction in which the relative rotation angle occurs) during the steering wheel 101 being turned to the right from the neutral state, namely the state where the torsion amount of the torsion bar 112 is zero, is defined as a positive direction (i.e., the steering torque T is defined to be positive). Also, a direction in which the relative rotation angle between the steering wheel 101 (the lower coupling shaft 108) and the pinion shaft 106 changes (a direction in which the relative rotation angle occurs) during the steering wheel 101 being turned to the left from the neutral state is defined as a negative direction (i.e., the steering torque T is defined to be negative).

When the steering torque T detected by the torque sensor 109 is positive, the base target current Ib is calculated by the base target current setting unit 21 so as to turn the electric motor 110 to the right, and a flow direction of this base target current Ib is defined as a positive direction. That is, when the steering torque T is positive, the base target current setting unit 21 calculates a positive base target current Ib to generate torque that causes the electric motor 110 to turn to the right. When the steering torque T is negative, the base target current setting unit 21 calculates a negative base target current Ib to generate torque that causes the electric motor 110 to turn to the left.

When the steering wheel 101 is turned to the right from the state where the steering angle θs, which is the rotation angle of the steering wheel 101, is zero, the steering angle θs becomes positive, and when the steering wheel 101 is turned to the left from that state, the steering angle θs becomes negative.

(Additional Current Setting Unit)

Figure 3:
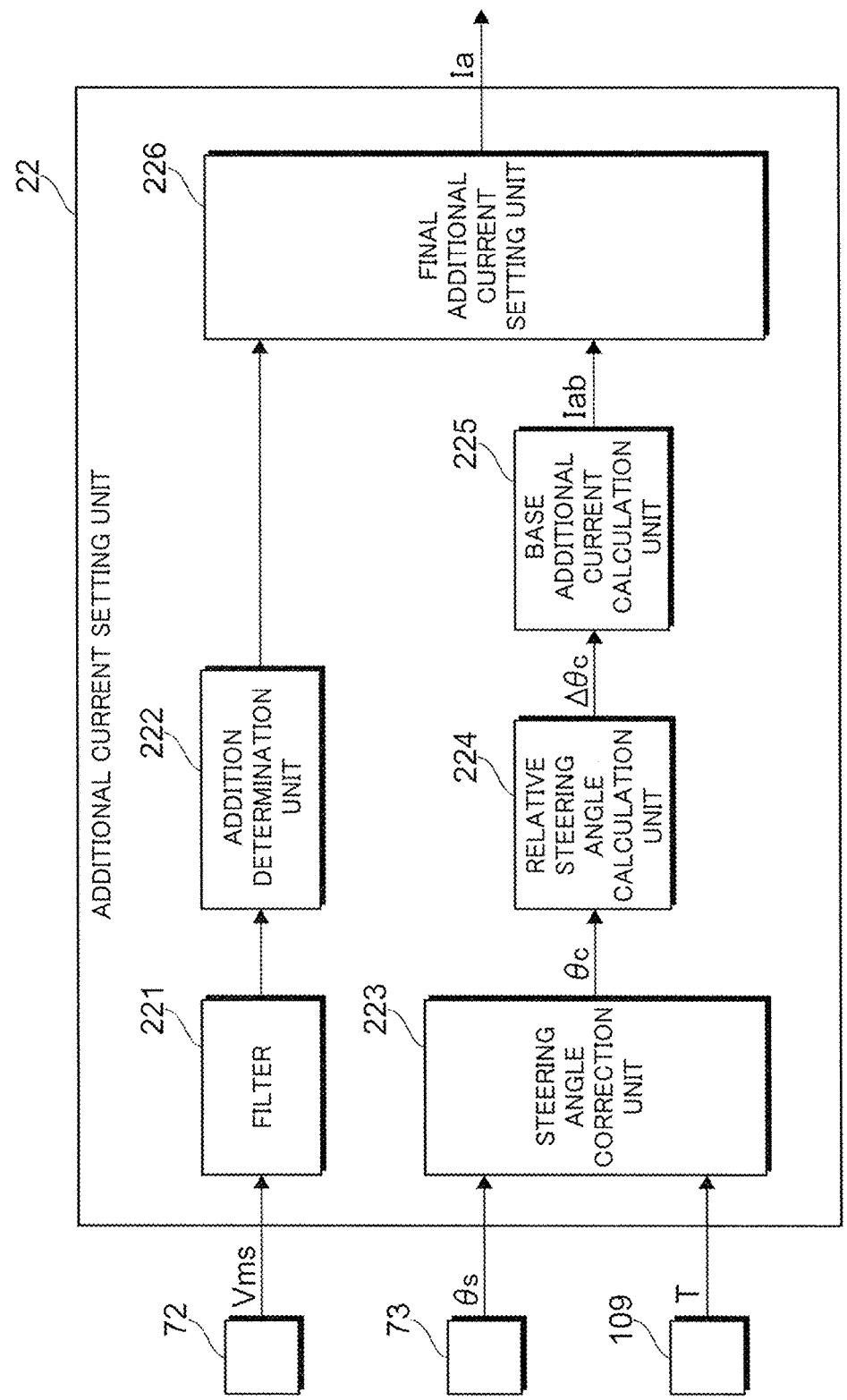
FIG. 3 is a schematic configuration diagram of an additional current setting unit of the first embodiment.

FIG. 3 is a schematic configuration diagram of the additional current setting unit 22 of the first embodiment.

The additional current setting unit 22 includes a filter 221 and an addition determination unit 222. The filter 221 filters the motor rotation speed signal Vms from the motor rotation speed calculation unit 72. The addition determination unit 222 determines whether the additional current Ia is to be added or not, on the basis of the output from the filter 221.

The additional current setting unit 22 further includes a steering angle correction unit 223 and a relative steering angle calculation unit 224. The steering angle correction unit 223 calculates a corrected steering angle θc by correcting the steering angle θs. The relative steering angle calculation unit 224 calculates a relative steering angle Δθc between a previous value θc (n−1) and a current value θc (n) of the corrected steering angle θc, on the basis of the corrected steering angle θc calculated by the steering angle correction unit 223.

The additional current setting unit 22 further includes a base additional current calculation unit 225 that calculates, on the basis of the relative steering angle Δθc calculated by the relative steering angle calculation unit 224, a base additional current Iab on which the additional current Ia is based.

The additional current setting unit 22 further includes a final additional current setting unit 226 that finally sets the additional current Ia on the basis of the determination made by the addition determination unit 222 and the base additional current Iab calculated by the base additional current calculation unit 225.

The filter 221 has the function of extracting low-frequency band components equal to or lower than a predetermined frequency by removing frequency band components higher than the predetermined frequency and the function of removing predetermined frequency band components in a frequency band equal to or lower than the predetermined frequency.

On the basis of the output from the filter 221, the addition determination unit 222 determines to supply the additional current Ia when the motor rotation speed Vm calculated by the motor rotation speed calculation unit 72 is zero, and determines not to supply the additional current Ia when the motor rotation speed Vm calculated by the motor rotation speed calculation unit 72 is not zero. Thus, the addition determination unit 222 serves as an example of the determination unit that determines, on the basis of the motor rotation speed Vm of the electric motor 110, whether a driving force larger than a base driving force caused by the base target current Ib is to be set.

The steering angle correction unit 223 calculates the corrected steering angle θc on the basis of the steering angle θs calculated by the steering angle calculation unit 73 and the steering torque T detected by the torque sensor 109. The steering angle correction unit 223 calculates the corrected steering angle θc by adding the steering angle θs calculated by the steering angle calculation unit 73 and a correcting steering angle θt corresponding to the steering torque T detected by the torque sensor 109 (θc=θs+θt). The correcting steering angle θt equals the steering angle θs at which the driver's steering of the steering wheel 101 only causes torsion of the torsion bar 112 and does not result in rotation of the pinion shaft 106. The steering angle correction unit 223 calculates the correcting steering angle θt by multiplying the steering torque T detected by the torque sensor 109 by a predetermined coefficient (e.g., reciprocal of the spring rate of the torsion bar 112).

The relative steering angle calculation unit 224 calculates the relative steering angle Δθc by subtracting the previous value θc (n−1) from the current value θc (n) of the corrected steering angle θc (Δθc=θc (n)−θc (n−1)).

Figure 4:
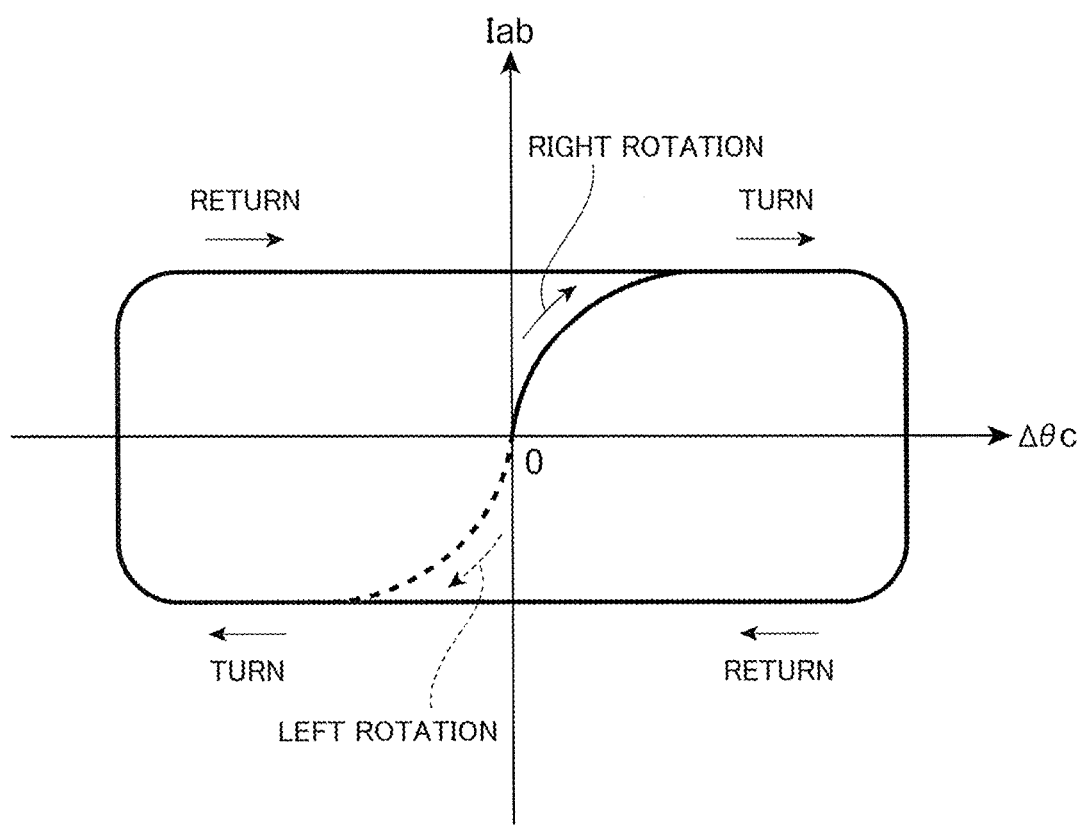
FIG. 4 is a schematic diagram of a control map representing correspondence between a relative steering angle and a base additional current.

FIG. 4 is a schematic diagram of a control map representing correspondence between the relative steering angle Δθc and the base additional current Iab.

The base additional current calculation unit 225 calculates the base additional current Iab according to the relative steering angle Δθc calculated by the relative steering angle calculation unit 224. For example, the base additional current calculation unit 225 calculates the base additional current Iab by substituting the relative steering angle Δθc into the control map, as exemplarily shown in FIG. 4, representing correspondence between the relative steering angle Δθc and the base additional current Iab. The control map may be empirically created and stored in the ROM in advance, for example. The base additional current calculation unit 225 calculates the base additional current Iab; in other words, the base additional current calculation unit 225 sets an additional driving force to be added to the base driving force caused by the base target current Ib, on the basis of the steering angle θs.

In the exemplary control map shown in FIG. 4, the base additional current Iab is positive when the steering wheel 101 is turned right. When the steering wheel 101 is turned right, the steering torque T is positive and the base target current Ib is also positive; thus, the base additional current Iab has the same sign as that of the base target current Ib. On the other hand, the base additional current Iab is negative when the steering wheel 101 is turned left. When the steering wheel 101 is turned left, the steering torque T is negative and the base target current Ib is also negative; thus, the base additional current Tab has the same sign as that of the base target current Ib.

When the addition determination unit 222 determines to supply the additional current Ia, the final additional current setting unit 226 sets the base additional current Tab calculated by the base additional current calculation unit 225 as the additional current Ia. When the addition determination unit 222 does not determine to supply the additional current Ia, the final additional current setting unit 226 sets the additional current Ia to zero.

A description will now be given of procedures of a target current setting process executed by the target current setting unit 20, with reference to a flowchart.

Figure 5:
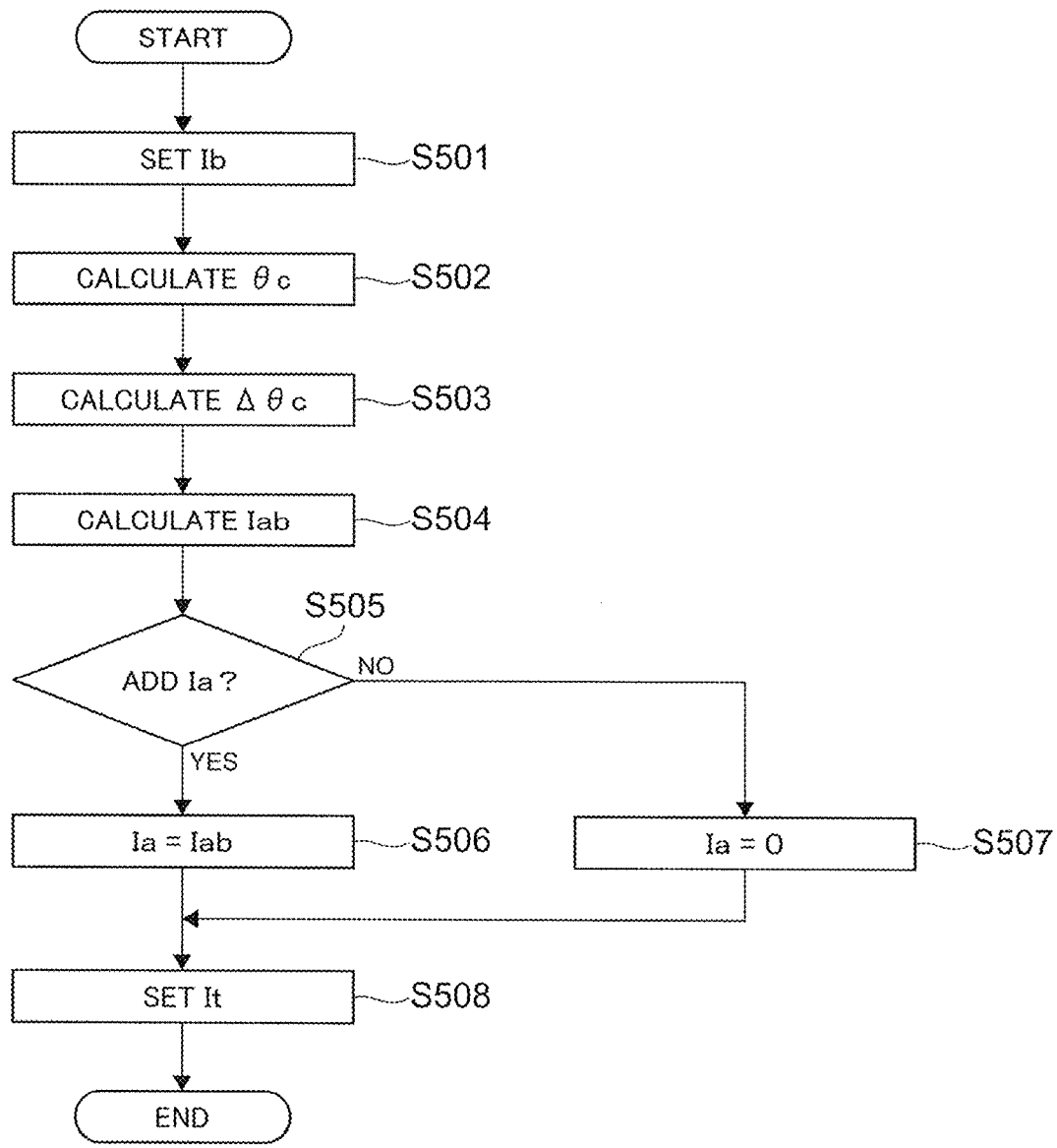
FIG. 5 is a flowchart of a target current setting process executed by a target current setting unit.

FIG. 5 is a flowchart of a target current setting process executed by the target current setting unit 20.

The target current setting unit 20 executes this target current setting process for e.g., every predetermined period (e.g., 1 millisecond).

The target current setting unit 20 sets the base target current Ib (S501). Specifically, the base target current setting unit 21 calculates the base target current Ib in the above-described manner.

The target current setting unit 20 calculates the corrected steering angle θc (S502). Specifically, the steering angle correction unit 223 calculates the corrected steering angle θc on the basis of the steering angle θs calculated by the steering angle calculation unit 73 and the steering torque T detected by the torque sensor 109.

Then, the target current setting unit 20 calculates the relative steering angle Δθc (S503). Specifically, the relative steering angle calculation unit 224 subtracts, from the current value θc (n) of the corrected steering angle θc calculated in S502, the previous value θc (n−1) of the corrected steering angle θc calculated in S502 in a previous routine of the flowchart.

Then, the target current setting unit 20 calculates the base additional current Iab (S504). Specifically, the base additional current calculation unit 225 calculates the base additional current Iab on the basis of the relative steering angle Δθc calculated in S503.

The target current setting unit 20 then determines whether the additional current Ia is to be added or not (S505). Specifically, when the obtained motor rotation speed Vm is zero, the addition determination unit 222 determines to add (supply) the additional current Ia. When the obtained motor rotation speed Vm is not zero, the addition determination unit 222 determines not to add (supply) the additional current Ia.

When the additional current Ia is to be added (Yes in S505), the target current setting unit 20 sets the base additional current Iab calculated in S504 as the additional current Ia (S506). On the other hand, when the additional current Ia is not to be added (No in S505), the target current setting unit 20 sets the additional current Ia to zero (S507).

The target current setting unit 20 then sets the target current It (S508). Specifically, the final target current setting unit 23 sets, as the target current It, the value obtained by adding the base target current Ib set in S501 and the additional current Ia set in S506 or S507.

As described above, the steering device 100 of the first embodiment is an example of the steering control device including: an electric motor 110 configured to add an assist force to steering of the steering wheel 101; a torque sensor 109 configured to detect the steering torque T; the base target current setting unit 21 configured to set a base driving force of the electric motor 110 on the basis of the steering torque T detected by the torque sensor 109; and the addition determination unit 222 as an example of a determination unit configured to determine whether a driving force larger than the base driving force is to be set, on the basis of the motor rotation speed Vm of the electric motor 110. When the motor rotation speed Vm is zero, the addition determination unit 222 is configured to determine that the driving force larger than the base driving force is to be set.

In other words, the steering device 100 of the first embodiment includes: the electric motor 110; the torque sensor 109; and the controller 10 configured to, when the electric motor 110 is unable to rotate under a base driving force of the electric motor 110 that is based on the steering torque T detected by the torque sensor 109 (i.e., when the motor rotation speed Vm is zero), set a driving force larger than the base driving force.

Here, "setting the driving force larger the base driving force" means adding, to the base driving force, a driving force in the same rotational direction as that of the electric motor 110 under the base driving force. In other words, when the base target current Ib, on which the base driving force is based, is positive, the target current It is set to the value that is obtained by adding the positive additional current Ia to the base target current Ib. On the other hand, when the base target current Ib, on which the base driving force is based, is negative, the target current It is set to the value that is obtained by adding the negative additional current Ia to the base target current Ib.

The steering device 100 of the first embodiment further includes the steering angle correction unit 223, the relative steering angle calculation unit 224, and the base additional current calculation unit 225 as examples of the additional driving force setting unit configured to set an additional driving force to be added to the base driving force on the basis of the steering angle θs of the steering wheel 101.

The steering device 100 of the first embodiment further includes the final target current setting unit 23 as an example of the final driving force setting unit configured to set a driving force larger than the base driving force by adding an additional driving force to the base driving force.

<<Functions and Effects of the Steering Device of the Embodiment>>

Figure 6:
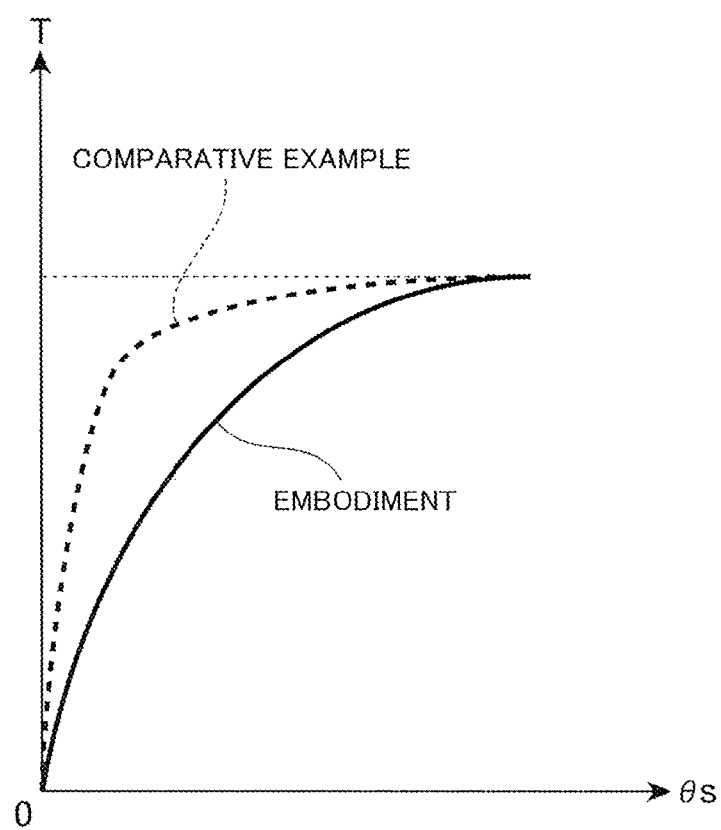
FIG. 6 shows relationship between a steering angle and steering torque.
Figure 7:
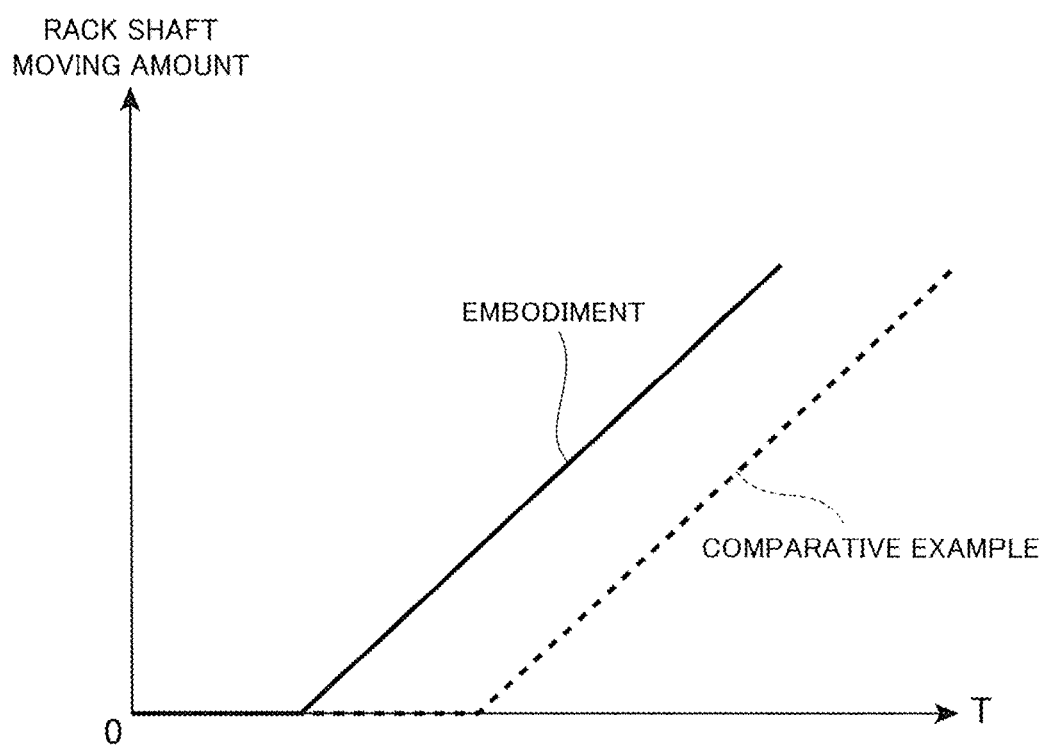
FIG. 7 shows relationship between the steering torque and the moving amount of a rack shaft.

FIG. 6 shows relationship between the steering angle θs and the steering torque T. FIG. 7 shows relationship between the steering torque T and the moving amount of the rack shaft 105. In each of FIGS. 6 and 7, relationship in the steering device 100 of the present embodiment is indicated by a solid line, and a comparative example, where the additional current Ia is not added to the base current It unlike in the steering device 100 of the present embodiment, is indicated by a dashed line. FIG. 6 shows the case where the steering wheel 101 is turned to the right from the position at which the steering angle θs is zero.

In the above-configured steering device 100 of the first embodiment, the base target current Ib added with the additional current Ia is set as the target current It. Accordingly, as compared to the configuration where the additional current Ia is not added (i.e., as compared to the comparative example), for example, the rack shaft 105 moves earlier at the start of turning of the steering wheel 101 and causes the wheels 150 to roll. That is, even when, for example, the driving force (base driving force) caused by the base target current Ib, which is set based on the steering torque T detected by the torque sensor 109 in response to turning of the steering wheel 101, is unable to overcome frictional force between the worm 111b fixed to the output shaft of the electric motor 110 and the worm wheel 111a fixed to the pinion shaft 106 and thus unable to cause rotation of the pinion shaft 106, adding the additional driving force caused by the additional current Ia can cause the pinon shaft 106 to rotate. This can, for example, shorten the time until the electric motor 110 starts to apply an assist force in response to the start of turning of the steering wheel 101. Hence, as shown in FIGS. 6 and 7, the steering device 100 of the first embodiment can, for example, apply an assist force from the electric motor 110 and reduce steering load at the initial start of turning of the steering wheel 101 (the steering torque T starts to reduce even at a small steering angle θs), and the rack shaft 105 starts to move earlier. As shown in FIGS. 6 and 7, in the comparative example, the steering angle θs hardly increases even under increased steering torque T at the initial start of turning of the steering wheel 101 (the rack shaft 105 hardly moves). In contrast, the steering device 100 of the first embodiment can make the steering angle θs large with increase in the steering torque T, and this improves steering feeling.

In the above embodiment, when the motor rotation speed Vm is zero, the addition determination unit 222 determines to supply the additional current Ia, and when the motor rotation speed Vm is not zero, the addition determination unit 222 does not determine to supply the additional current Ia. The present invention is, however, not limited to this. For example, the addition determination unit 222 may determine to supply the additional current Ia when an absolute value of the motor rotation speed Vm is not more than a predetermined rotation speed, and may determine not to supply the additional current Ia when the absolute value of the motor rotation speed Vm is more than the predetermined rotation speed. In other words, the motor rotation speed Vm may be deemed to be zero when the absolute value of the motor rotation speed Vm is not more than the predetermined rotation speed (i.e., an area in which the absolute value of the motor rotation speed Vm is not more than the predetermined rotation speed may be defined as a dead zone area).

When determining whether to supply the additional current Ia, the addition determination unit 222 may refer to the steering angle speed Vθ and the steering angle θs, besides the motor rotation speed Vm. For example, the addition determination unit 222 may grasp the steering angle speed Vθ on the basis of the steering angle θs calculated by the steering angle calculation unit 73.

Alternatively, the addition determination unit 222 may determine not to supply the additional current Ia despite the motor rotation speed Vm being zero (or despite the absolute value of the motor rotation speed Vm being not more than the predetermined rotation speed) when an absolute value of the steering angle speed Vθ is not more than a predetermined speed and also an absolute value of the steering angle θs is not more than a predetermined angle. This can prevent movement of the rack shaft 105 and rolling of the wheels 150 at the near-zero steering angle θs (at the absolute value of the steering angle θs not more than the predetermined angle) while the driver is not intentionally steering the steering wheel 101.

Second Embodiment

The steering device 100 of the second embodiment is different from the steering device 100 of the first embodiment in terms of the additional current setting unit 22 of the target current setting unit 20 of the controller 10. The below description will focus on the difference from the steering device 100 of the first embodiment, and thus omit details of the same parts as those of the steering device 100 of the first embodiment.

Figure 8:
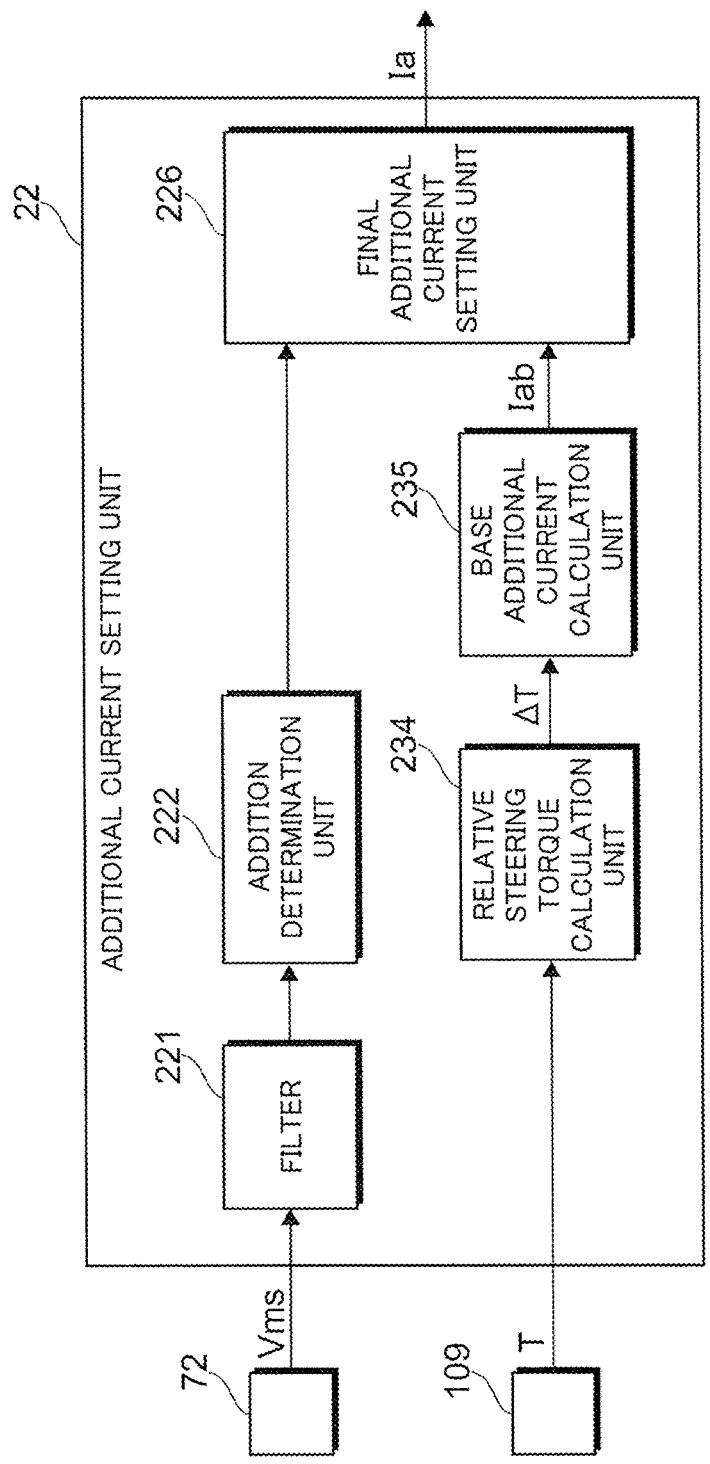
FIG. 8 is a schematic configuration diagram of the additional current setting unit of the second embodiment.

FIG. 8 is a schematic configuration diagram of the additional current setting unit 22 of the second embodiment.

The additional current setting unit 22 of the second embodiment is different from the additional current setting unit 22 of the first embodiment in terms of the method to calculate the base additional current Iab. The additional current setting unit 22 of the second embodiment calculates the base additional current Iab on the basis of the steering torque T detected by the torque sensor 109.

More specifically, the additional current setting unit 22 of the second embodiment includes a relative steering torque calculation unit 234 and a base additional current calculation unit 235, as shown in FIG. 8. The relative steering torque calculation unit 234 calculates, on the basis of the steering torque T detected by the torque sensor 109, a relative steering torque ΔT between a previous value T (n−1) of the steering torque T and a current value T (n) of the steering torque T. The base additional current calculation unit 235 calculates the base additional current Iab on the basis of the relative steering torque ΔT.

The relative steering torque calculation unit 234 calculates the relative steering torque ΔT by subtracting the previous value T (n−1) from the current value T (n) of the steering torque T detected by the torque sensor 109 (ΔT=T (n)−T (n−1)).

Figure 9:
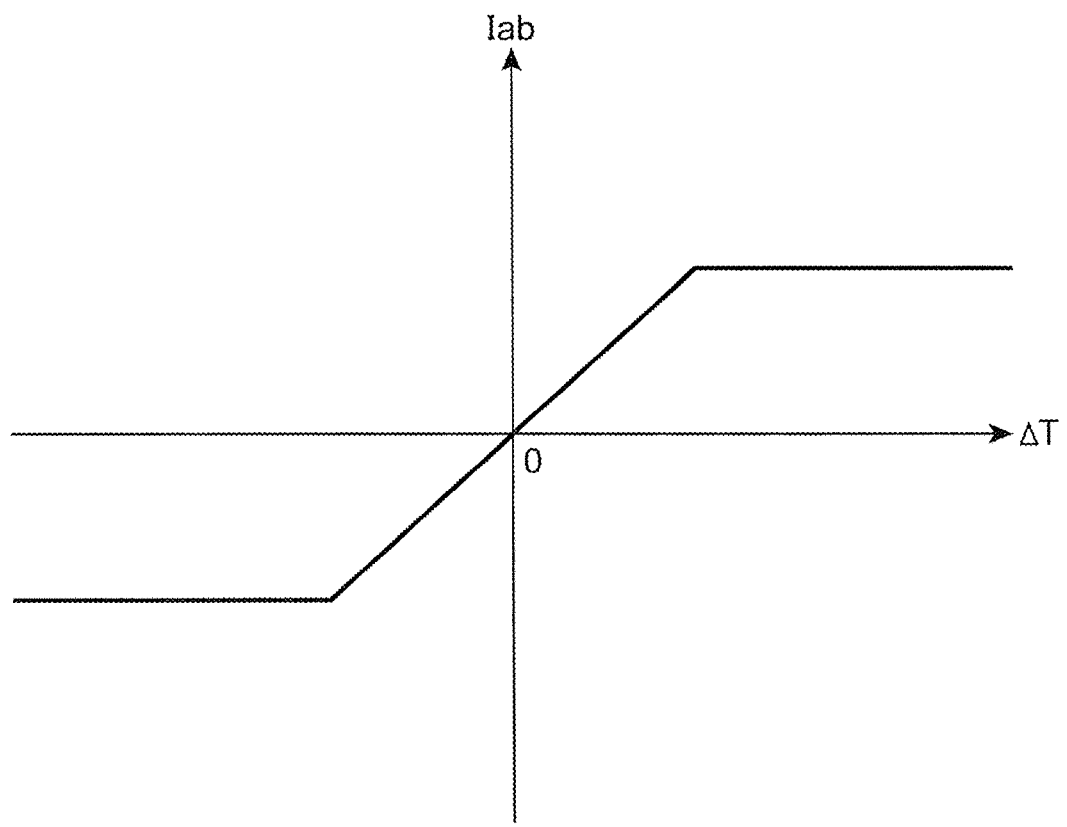
FIG. 9 is a schematic diagram of a control map representing correspondence between the relative steering torque and the base additional current.

FIG. 9 is a schematic diagram of a control map representing correspondence between the relative steering torque ΔT and the base additional current Iab.

The base additional current calculation unit 235 calculates the base additional current Iab according to the relative steering torque ΔT calculated by the relative steering torque calculation unit 234. For example, the base additional current calculation unit 235 calculates the base additional current Iab by substituting the relative steering torque ΔT into the control map, as exemplarily shown in FIG. 9, representing correspondence between the relative steering torque ΔT and the base additional current Iab. The control map may be empirically created and stored in the ROM in advance, for example. The control map shown in FIG. 9 is defined such that when an absolute value of the relative steering torque ΔT is not more than a predetermined value, an absolute value of the base additional current Iab increases with increase in the absolute value of the relative steering torque ΔT and when the absolute value of the relative steering torque ΔT is more than the predetermined value, the base additional current Iab is constant. The correlation between the relative steering torque ΔT and the base additional current Iab exemplarily shown in FIG. 9 may be changed according to the vehicle speed Vc. For example, at a given relative steering torque ΔT, the base additional current Iab may be set to increase with decrease in the vehicle speed Vc.

The steering device 100 of the second embodiment includes the relative steering torque calculation unit 234 and the base additional current calculation unit 235 as examples of the additional driving force setting unit configured to set an additional driving force to be added to the base driving force on the basis of the steering torque T detected by the torque sensor 109.

The above-configured steering device 100 of the second embodiment sets, as the target current It, the base target current Ib added with the additional current Ia. This can, for example, shorten the time until the electric motor 110 starts to apply an assist force in response to the start of operation of the steering wheel 101, such as the start of turning of the steering wheel 101. Also, the additional current Ia increases with increase in the steering torque T, which can more accurately reduce the steering load at the start of operation of the steering wheel 101.

Third Embodiment

The steering device 100 of the third embodiment is different from the steering device 100 of the first embodiment in terms of the additional current setting unit 22 of the target current setting unit 20 of the controller 10. The below description will focus on the difference from the steering device 100 of the first embodiment, and thus omit details of the same parts as those of the steering device 100 of the first embodiment.

Figure 10:
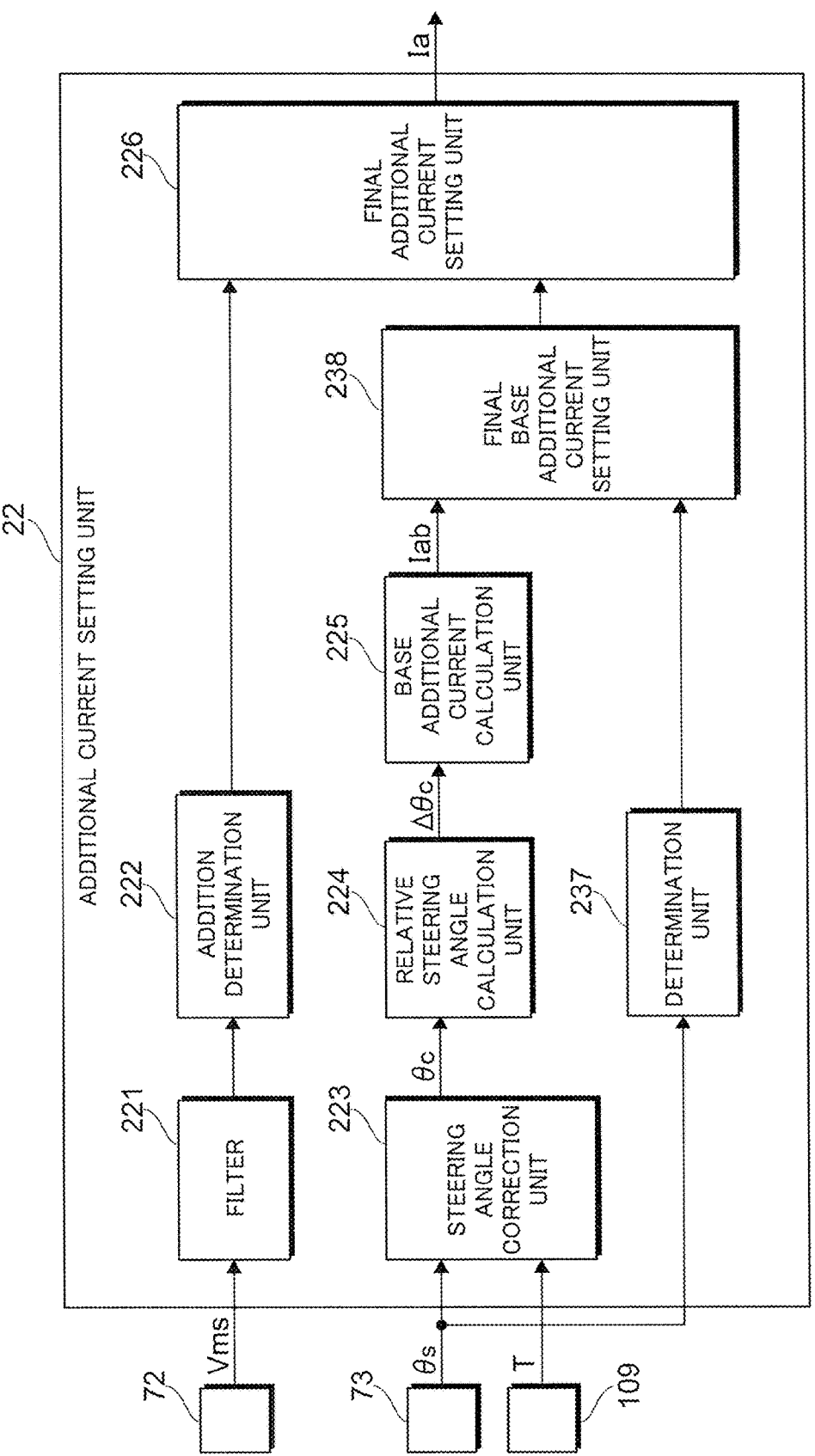
FIG. 10 is a schematic configuration diagram of the additional current setting unit of the third embodiment.

FIG. 10 is a schematic configuration diagram of the additional current setting unit 22 of the third embodiment.

The additional current setting unit 22 of the third embodiment is different from the additional current setting unit 22 of the first embodiment in that the additional current setting unit 22 of the third embodiment further includes the function of setting the base additional current Iab to zero upon predetermined conditions being met.

More specifically, the additional current setting unit 22 of the third embodiment includes a judging unit 237 and a final base additional current setting unit 238. The judging unit 237 judges whether predetermined conditions under which the base additional current Iab is to be set to zero are met. The final base additional current setting unit 238 finally sets the base additional current Iab on the basis of the judgement made by the judging unit 237 and the base additional current Iab calculated by the base additional current calculation unit 225.

When an absolute value of the steering angle speed Vθ is not more than a predetermined speed and also an absolute value of the steering angle θs is not more than a predetermined angle, the judging unit 237 judges that the predetermined conditions are met. When the absolute value of the steering angle speed Vθ is more than the predetermined speed and/or when the absolute value of the steering angle θs is more than the predetermined angle, the judging unit 237 judges that the predetermined conditions are not met. For example, the judging unit 237 may grasp the steering angle speed Vθ on the basis of the steering angle θs calculated by the steering angle calculation unit 73.

When the judging unit 237 judges that the predetermined conditions are met, the final base additional current setting unit 238 sets the base additional current Iab, which is to be output to the final additional current setting unit 226, to zero. On the other hand, when the judging unit 237 judges that the predetermined conditions are not met, the final base additional current setting unit 238 sets the base additional current Iab, which is to be output to the final additional current setting unit 226, to the one that is calculated by the base additional current calculation unit 225.

The steering device 100 of the third embodiment includes the steering angle correction unit 223, the relative steering angle calculation unit 224, the base additional current calculation unit 225, the judging unit 237, and the final base additional current setting unit 238 as examples of the additional driving force setting unit configured to set an additional driving force to be added to the base driving force on the basis of the steering angle θs of the steering wheel 101. The judging unit 237 judges whether the base additional current Iab, and eventually the additional current Ia (additional driving force), is to be set to zero, on the basis of the steering angle speed Vθ and the steering angle θs.

The steering device 100 of the third embodiment sets the additional current Ia to zero when the absolute value of the steering angle speed Vθ is not more than the predetermined speed and also the absolute value of the steering angle θs is not more than the predetermined angle. This can prevent movement of the rack shaft 105 and rolling of the wheels 150 at the near-zero steering angle θs (at the absolute value of the steering angle θs not more than the predetermined angle) while the driver is not intentionally steering the steering wheel 101.

Fourth Embodiment

Figure 11:
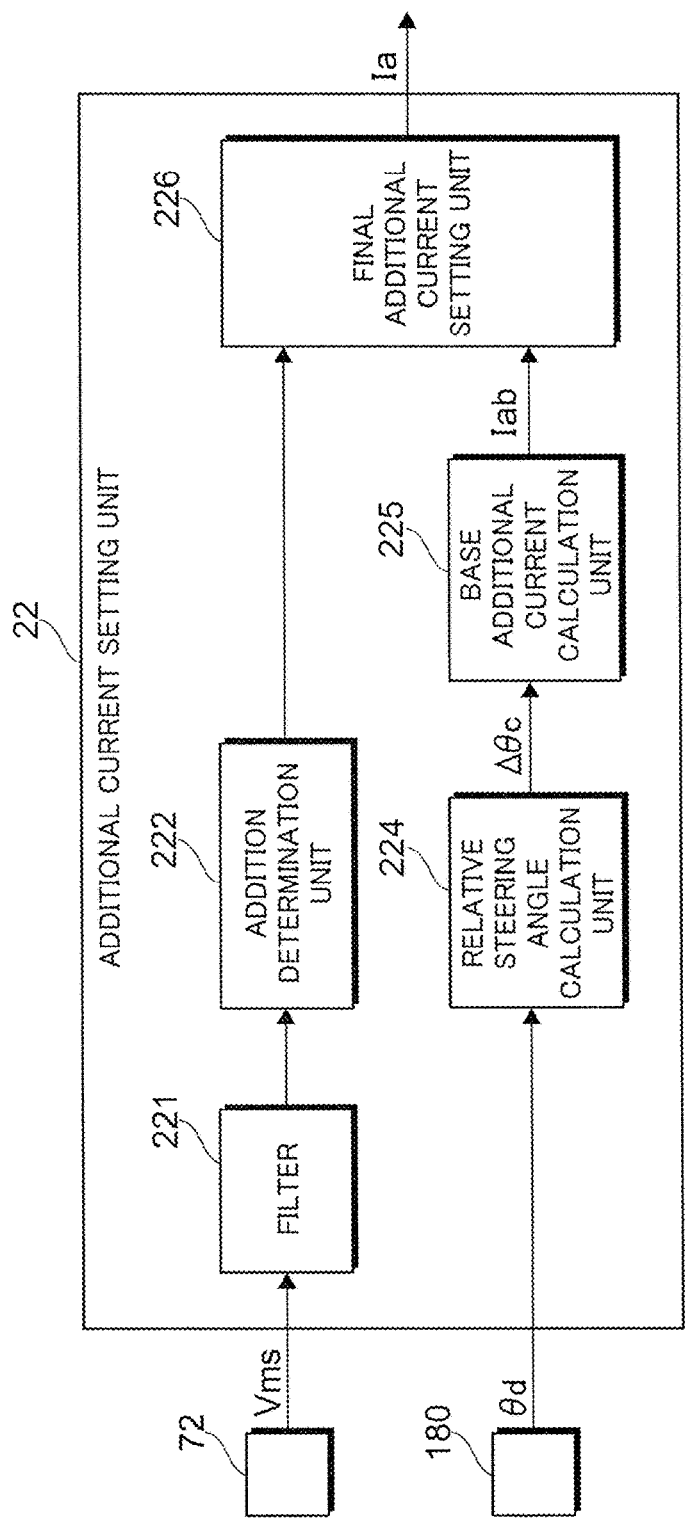
FIG. 11 is a schematic configuration diagram of the additional current setting unit of the fourth embodiment.

FIG. 11 is a schematic configuration diagram of the additional current setting unit 22 of the fourth embodiment.

The steering device 100 of the fourth embodiment is different from the steering device 100 of the first embodiment in terms of the presence of a steering angle sensor 180 for detecting the steering angle θs and in terms of the additional current setting unit 22 of the target current setting unit 20 of the controller 10. The below description will focus on the difference from the steering device 100 of the first embodiment, and thus omit details of the same parts as those of the steering device 100 of the first embodiment. For example, the steering angle sensor 180 may include the following components, namely: a first rotary member (not shown) attached to the steering shaft 102 and rotating in synchronization with the steering shaft 102; a second rotary member (not shown) rotating in conjunction with the rotation of the first rotary member; and a magnetoresistive element (not shown) detecting changes in magnetic field of a magnetized part fixed to the second rotary member. The steering angle sensor 180 outputs sine wave signals and cosine wave signals corresponding to a rotation angle of the steering wheel 101.

The additional current setting unit 22 of the fourth embodiment differs from the additional current setting unit 22 of the first embodiment in terms of the method to calculate the relative steering angle 40c. The relative steering angle calculation unit 224 of the additional current setting unit 22 of the fourth embodiment calculates the relative steering angle Δθc on the basis of a detected steering angle θd detected by the steering angle sensor 180.

More specifically, the relative steering angle calculation unit 224 of the fourth embodiment calculates the relative steering angle Δθc by subtracting a previous value θd (n−1) from a current value θd (n) of the detected steering angle θd detected by the steering angle sensor 180 (Δθc=θd (n)−θd (n−1)).

The steering device 100 of the fourth embodiment includes the relative steering angle calculation unit 224 and the base additional current calculation unit 225 as examples of the additional driving force setting unit configured to set an additional driving force to be added to the base driving force on the basis of the steering angle θs of the steering wheel 101. The relative steering angle calculation unit 224 sets the base additional current Iab, and eventually the additional current Ia (additional driving force), on the basis of the detected steering angle θd detected by the steering angle sensor 180 detecting the steering angle θs.

The additional current setting unit 22 of the fourth embodiment calculates the relative steering angle Δθc on the basis of the detected steering angle θd detected by the steering angle sensor 180 detecting the steering angle θs and calculates the base additional current Iab on the basis of this relative steering angle Δθc. This allows to more accurately set the additional current Ia that is suitable for the driver's operation of the steering wheel 101.

Fifth Embodiment

Figure 12:
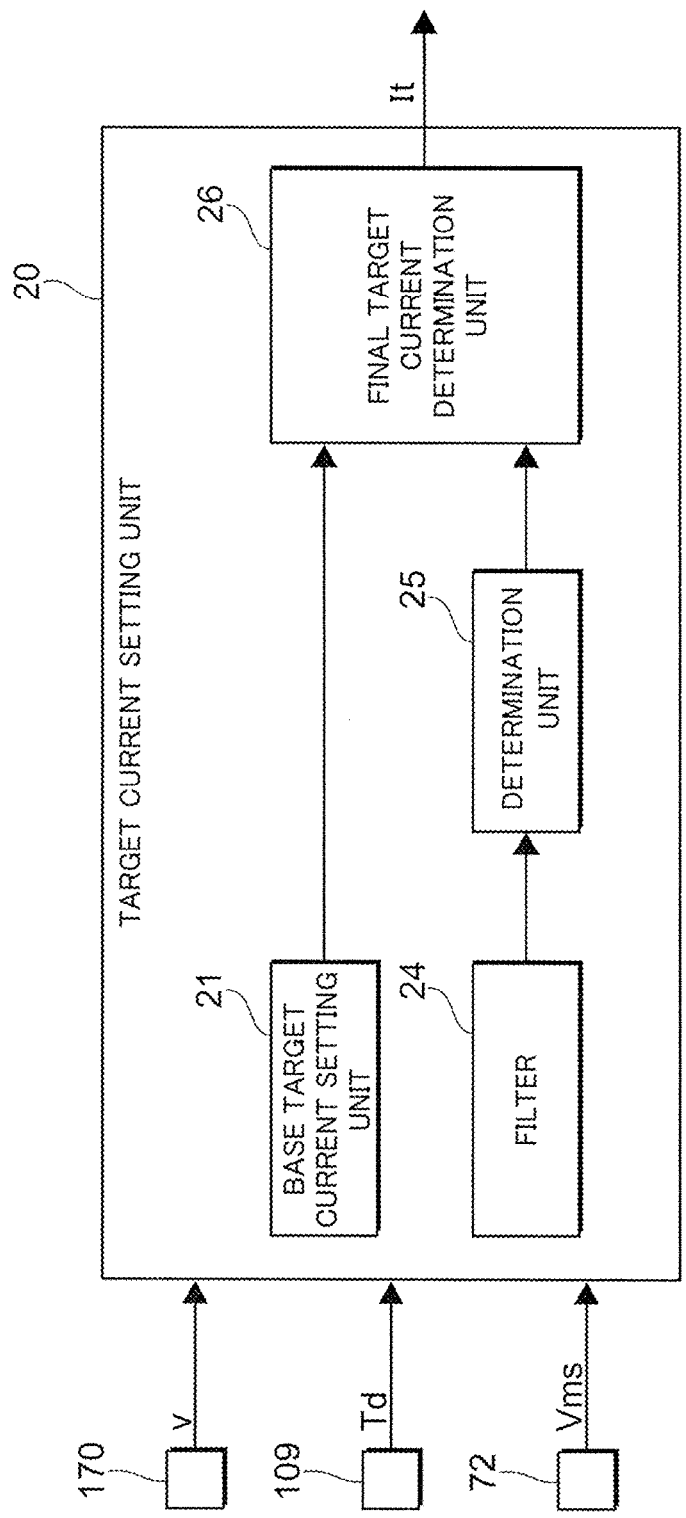
FIG. 12 is a schematic configuration diagram of the target current setting unit of the fifth embodiment.

FIG. 12 is a schematic configuration diagram of the target current setting unit 20 of the fifth embodiment.

The steering device 100 of the fifth embodiment differs from the steering device 100 of the first embodiment in terms of the target current setting unit 20. The below description will focus on the difference from the steering device 100 of the first embodiment, and thus omit details of the same parts as those of the steering device 100 of the first embodiment.

The target current setting unit 20 of the fifth embodiment includes: the base target current setting unit 21; a filter 24; and a determination unit 25 that determines whether the base target current Ib set by the base target current setting unit 21 is to be set as the target current It finally supplied to the electric motor 110. The target current setting unit 20 of the fifth embodiment further includes a final target current determination unit 26 that determines the target current It finally supplied to the electric motor 110, on the basis of the determination made by the determination unit 25.

The filter 24 has the same function as the filter 221 of the first embodiment.

On the basis of output values from the filter 24, the determination unit 25 determines to supply the base target current Ib when the motor rotation speed Vm calculated by the motor rotation speed calculation unit 72 is not zero. On the other hand, on the basis of output values from the filter 24, the determination unit 25 determines to supply a current different from the base target current Ib when the motor rotation speed Vm calculated by the motor rotation speed calculation unit 72 is zero. Thus, the determination unit 25 functions as an example of the determination unit that determines, on the basis of the motor rotation speed Vm of the electric motor 110, whether a driving force larger than the base driving force caused by the base target current Ib is to be set. Alternatively, the determination unit 25 may determine to supply a current different from the base target current Ib when an absolute value of the motor rotation speed Vm is not more than a predetermined rotation speed, and may determine to supply the base target current Ib when the absolute value of the motor rotation speed Vm is more than the predetermined rotation speed.

When the determination unit 25 determines to supply the base target current Ib, the final target current determination unit 26 determines the base target current Ib as the target current It that is finally supplied to the electric motor 110. On the other hand, when the determination unit 25 determines to supply the current different from the base target current Ib, the final target current determination unit 26 determines a large current Ig larger than the base target current Ib as the target current It that is finally supplied to the electric motor 110.

For example, the final target current determination unit 26 may calculate the large current Ig by either of the following two methods (1) and (2):

(1) the final target current determination unit 26 may calculate the large current Ig on the basis of the torque signal Td and the vehicle speed signal v. The final target current determination unit 26 sets a positive large current Ig when the steering torque T is positive, and sets a negative large current Ig when the steering torque T is negative. At a given absolute value of the steering torque T, the final target current determination unit 26 sets a larger absolute value of the large current Ig with decrease in the vehicle speed Vc. At a given absolute value of the steering torque T, the final target current determination unit 26 makes the absolute value of the large current Ig larger than that of the base target current Ib.

The controller 10 may include a base control map for calculating the base target current Ib and a large current control map for calculating the large current Ig and, depending on whether the determination unit 25 has decided to supply the base target current Ib, may switch the control maps to calculate the current that is finally set as the target current It. The large current control map may be prepared such that, at a given absolute value of the steering torque T and a given vehicle speed Vc, the absolute value of the large current Ig calculated using the large current control map becomes larger than that of the base target current Ib calculated using the base control map. In other words, the large current control map may be prepared such that, at a given absolute value of the steering torque T and a given vehicle speed Vc, the driving force of the electric motor 110 caused by the large current Ig calculated using the large current control map becomes larger than the driving force caused by the base target current Ib calculated using the base control map. When the determination unit 25 determines to supply the base target current Ib, the target current setting unit 20 of the fifth embodiment determines the base target current Ib calculated using the base control map to be the target current It finally supplied to the electric motor 110, and when the determination unit 25 determines to supply the current different from the base target current Ib, the target current setting unit 20 of the fifth embodiment determines the large current Ig calculated using the large current control map to be the target current It finally supplied to the electric motor 110.

(2) the final target current determination unit 26 may multiply the base target current Ib by a predetermined gain G, which is larger than 1, to obtain the large current Ig (=Ib×G).

The above configured steering device 100 of the fifth embodiment determines the large current Ig, which is larger than the base target current Ib, as the target current It. This can, for example, shorten the time until the electric motor 110 starts to apply an assist force in response to the start of operation of the steering wheel 101, such as the start of turning of the steering wheel 101.

The differences of the additional current setting unit 22 of the second to the fifth embodiments from the additional current setting unit 22 of the first embodiment may be combined with each other.

The elements of the controller 10 in the above embodiments may be implemented by either hardware or software. When some or all of the elements of the present invention are implemented by software, that software (computer programs) may be provided in the form of a computer-readable storage medium. Examples of the computer-readable storage medium include, but not limited to, portable storage media such as flexible disks and CD-ROMs, internal storage devices inside the computer such as RAMs and ROMs, and external storage devices such as hard disk drives.

REFERENCE SIGNS LIST

10 Controller
20 Target current setting unit
21 Base target current setting unit
22 Additional current setting unit
72 Motor rotation speed calculation unit
109 Torque sensor
111 Deceleration mechanism
112 Torsion bar
221 Filter
222 Addition determination unit
223 Steering angle correction unit
224 Relative steering angle calculation unit
225 Base additional current calculation unit
226 Final additional current setting unit

The invention claimed is:

1. A steering control device comprising:
an electric motor configured to apply an assist force to steering of a steering member;
a torque detection unit configured to detect steering torque of the steering member;
a base driving force setting unit configured to set a base driving force of the electric motor based on the steering torque detected by the torque detection unit;
a determination unit configured to determine whether a driving force larger than the base driving force is to be set, based on a rotation speed of the electric motor;
an additional driving force setting unit configured to set an additional driving force to be added to the base driving force, based on a steering angle of the steering member; and
a final driving force setting unit configured to set a final driving force larger than the base driving force by adding the additional driving force to the base driving force, wherein
the additional driving force setting unit is configured to calculate a corrected steering angle by adding the steering angle calculated based on a rotation angle of the electric motor and a correcting steering angle calculated by multiplying the steering torque detected by the torque detection unit by a predetermined coefficient, and set the additional driving force based on a change in the corrected steering angle such that the final driving force overcomes a frictional force that is produced during a driving force of the electric motor being transmitted to a rolling wheel.

2. The steering control device according to claim 1, wherein the determination unit is configured to determine whether the driving force larger than the base driving force is to be set, further based on a steering angle speed of the steering member and a steering angle of the steering member.

3. The steering control device according to claim 2, wherein, when the rotation speed of the electric motor is not more than a predetermined rotation speed, the determination unit is configured to determine that the driving force larger than the base driving force is to be set.

4. The steering control device according to claim 3, wherein the additional driving force setting unit is configured to determine whether the additional driving force is to be set to zero, based on a steering angle speed of the steering member and a steering angle of the steering member.

5. The steering control device according to claim 2, wherein the additional driving force setting unit is configured to determine whether the additional driving force is to be set to zero, based on a steering angle speed of the steering member and a steering angle of the steering member.

6. The steering control device according to claim 1, wherein, when the rotation speed of the electric motor is not more than a predetermined rotation speed, the determination unit is configured to determine that the driving force larger than the base driving force is to be set.

7. The steering control device according to claim 6, wherein the additional driving force setting unit is configured to determine whether the additional driving force is to be set to zero, based on a steering angle speed of the steering member and a steering angle of the steering member.

8. The steering control device according to claim 1, wherein the additional driving force setting unit is configured to determine whether the additional driving force is to be set to zero, based on a steering angle speed of the steering member and a steering angle of the steering member.

9. An electric power steering device configured to control, by use of the steering control device according to claim 1, steering of a steering wheel provided in a vehicle as the steering member.

10. An electric power steering device comprising:
an electric motor configured to apply an assist force to steering of a steering wheel of a vehicle;
a torque detection unit configured to detect steering torque of the steering wheel; and
a controller configured to, when the electric motor is unable to rotate under a base driving force of the electric motor that is based on the steering torque detected by the torque detection unit, set a driving force larger than the base driving force, wherein
the controller comprises:
a base driving force setting unit configured to set the base driving force of the electric motor based on the steering torque detected by the torque detection unit;
a determination unit configured to determine whether a driving force larger than the base driving force is to be set, based on a rotation speed of the electric motor;
an additional driving force setting unit configured to set an additional driving force to be added to the base driving force, based on a steering angle of the steering wheel; and a final driving force setting unit configured to set a final driving force larger than the base driving force by adding the additional driving force to the base driving force, and the additional driving force setting unit is configured to calculate a corrected steering angle by adding the steering angle calculated based on a rotation angle of the electric motor and a correcting steering angle calculated by multiplying the steering torque detected by the torque detection unit by a predetermined coefficient, and set the additional driving force based on a change in the corrected steering angle such that the final driving force overcomes a frictional force that is produced during a driving force of the electric motor being transmitted to a rolling wheel.

* * * * *